United States Patent [19]

Ito

[11] Patent Number: 4,706,978

[45] Date of Patent: Nov. 17, 1987

[54] VEHICULAR REAR WHEEL STEER ANGLE CONTROL SYSTEM

[75] Inventor: Ken Ito, Yokohama, Japan

[73] Assignee: Nissan Motor Co., Ltd.

[21] Appl. No.: 879,303

[22] Filed: Jun. 27, 1986

[30] Foreign Application Priority Data

Jul. 2, 1985 [JP] Japan ................... 60-143842

[51] Int. Cl.$^4$ ............................. B62D 7/14
[52] U.S. Cl. ...................... 280/91; 180/140; 180/142
[58] Field of Search ............ 280/91, 99; 180/140, 180/142, 236

[56] References Cited

U.S. PATENT DOCUMENTS 4,263,979  4/1981  Sturgill ................... 280/91

FOREIGN PATENT DOCUMENTS 58-97566  6/1983  Japan .
745757   7/1980  U.S.S.R. ............... 280/91

Primary Examiner—John J. Love
Assistant Examiner—Kenneth R. Rice
Attorney, Agent, or Firm—Leydig, Voit & Mayer

[57] ABSTRACT

A four wheel steer vehicle is equipped with a steering control system for controlling a rear wheel steer angle so that a rear end of the vehicle follows a path along which a front end moves. The control system includes a front wheel steer angle sensor, a controller for producing a control signal representing a desired rear wheel steer angle and an actuator for altering the rear wheel steer angle in response to the control signal produced by the controller. The controller estimates the path of the front end by calculating a value of a course angle of the front end from the front wheel steer angle each time the vehicle travels a predetermined short distance, and storing a predetermined number of the course angle values which are most recently determined. The controller determines the desired rear wheel steer angle so that the course angle of the rear end equals the oldest one of the stored course angle values of the front end.

16 Claims, 7 Drawing Figures

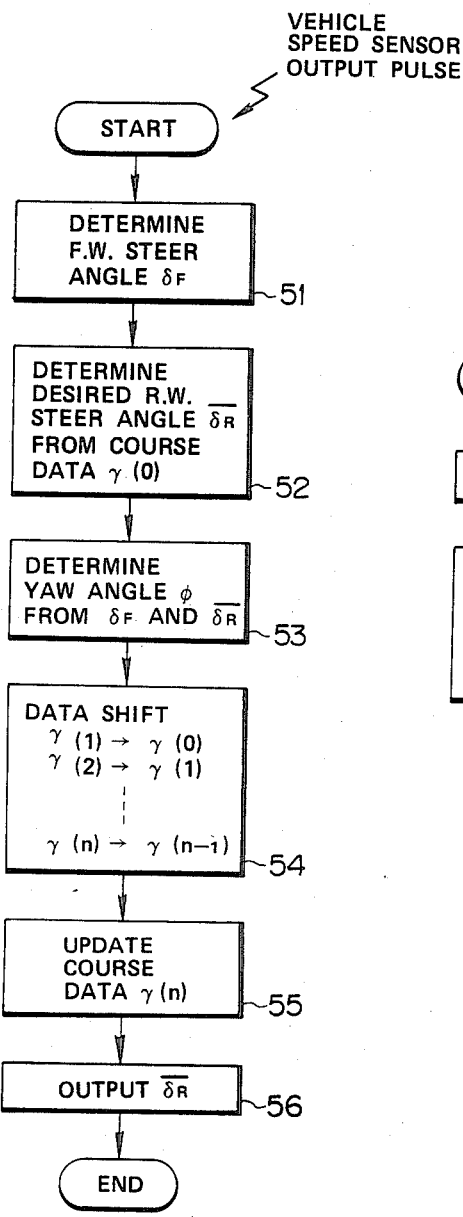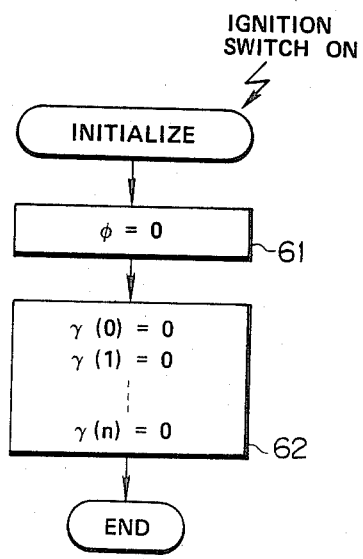

VEHICULAR REAR WHEEL STEER ANGLE CONTROL SYSTEM

BACKGROUND OF THE INVENTION

The present invention relates to a four wheel steer vehicle having steerable front wheels and steerable rear wheels, and more specifically to a rear wheel steer angle control system for preventing a rear end of such a four wheel steer vehicle from swinging outwardly during a turn and for reducing almost to zero a difference between the radii of turning arcs of the outside or inside front and rear wheels.

Japanese patent provisional publication No. 58-97566 discloses one example of a four wheel steer system. This system is arranged to steer the rear wheels in a direction opposite to the steering direction of the front wheels to decrease the turning radius when a steering wheel angle is larger than a predetermined value.

However, this system causes the rear end of the vehicle to swing so outwardly during a turn that the rear end is liable to bump laterally against an object lying alongside the vehicle.

SUMMARY OF THE INVENTION

It is therefore an object of the invention to provide a rear wheel steer angle control system for preventing an outward swing of the rear end of the vehicle during a turn and reducing the difference between the radii of turning arcs of the front and rear wheels.

According to the present invention, a steering control system for a vehicle having at least one steerable front wheel and at least one steerable rear wheel comprises sensor means, a controller and actuator means. The sensor means includes at least means for sensing an actual front wheel steer angle of the vehicle. The controller estimates a path traveled by a predetermined front point in a front portion of the vehicle during motion of the vehicle, from the actual front wheel steer angle sensed by the front wheel steer angle sensing means, and determines a desired rear wheel steer angle required to cause a predetermined rear point in a rear portion of the vehicle to follow the path of the front point. The actuator means steers the rear wheel of the vehicle in accordance with the desired rear wheel steer angle determined by the controller so that the actual rear wheel steer angle is maintained equal to the desied angle.

BRIEF DESCRIPTION OF THE DRAWINGS

FIGS. 2 and 3 are flowcharts showing programs used in the control system of FIG. 1;

DETAILED DESCRIPTION OF THE INVENTION

Figure 7:
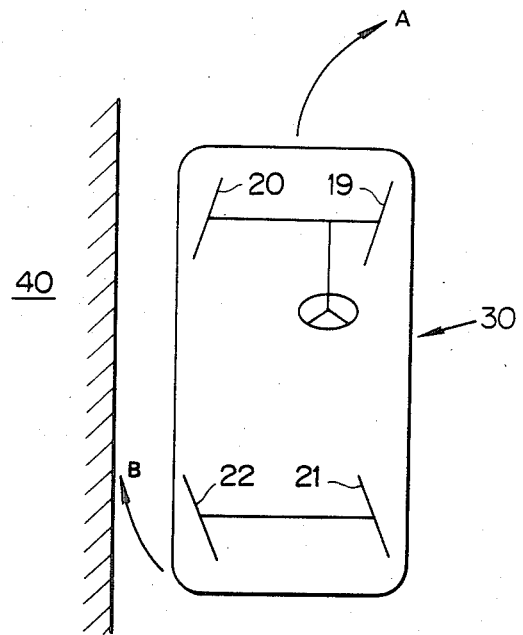
FIG. 7 is a schematic view showing a turning movement of a prior art four wheel steer vehicle.

FIG. 7 shows a behavior of a four wheel steer vehicle controlled by the prior art system disclosed in the above-mentioned Japanese patent provisional publication. When a vehicle 30 is started in a direction shown by an arrow A from a parking position by steering the front wheels 19 and 20 through a large amount, then this system steers the rear wheels 21 and 22 through a large amount in the opposite direction. Therefore, the rear end of the vehicle swings outwardly as shown by an arrow B, and bumps against a wall 40 or a next vehicle lying alongside the vehicle 30.

Figure 1:
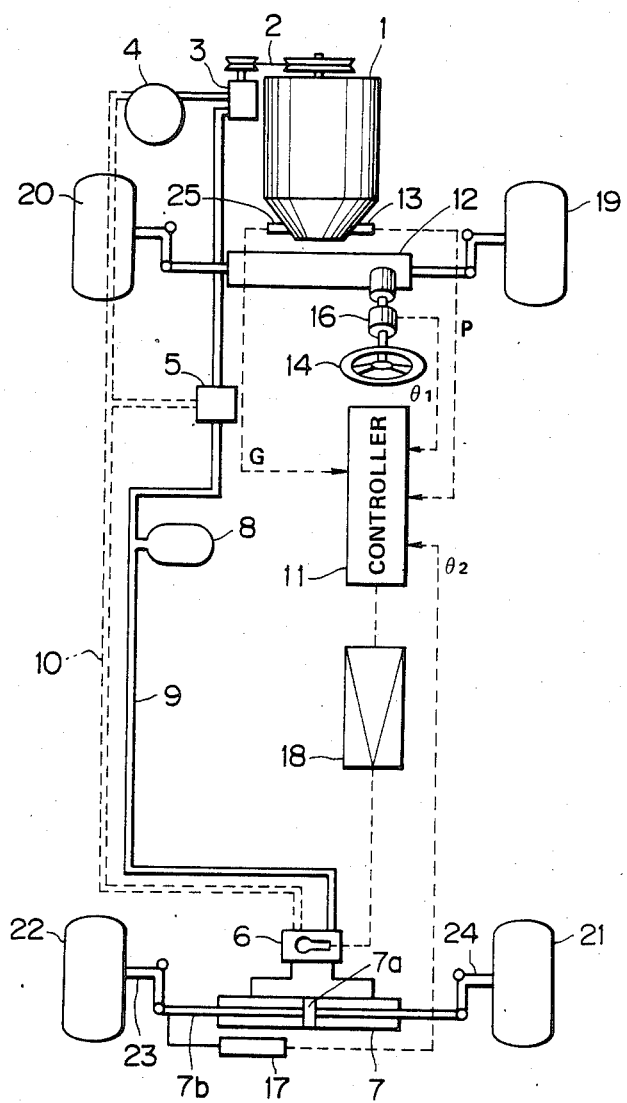
FIG. 1 is a view of a vehicle showing a control system of one embodiment of the present invention.

One embodiment of the present invention is shown in FIG. 1.

Front wheels 19 and 20 of the vehicle are steered through a steering unit 12 such as a conventional mechanical steering linkage or a power steering apparatus. An actual front wheel steer angle of the front wheels 19 and 20 is proportional to an angular displacement of a steering wheel 14.

Rear wheels 21 and 22 are steered through a hydraulic actuator 7. The actuator 7 has a piston 7a and a piston rod 7b whose ends are connected with knuckle arms 23 and 24 of the rear wheels 21 and 22, respectively. The piston 7a moves in accordance with a fluid pressure difference between right and left oil pressure chambers.

The hydraulic actuator 7 is supplied with the oil from an oil pump 3 through unloading valve 5, accumulator 8, oil passage 9 and servo valve 6. The oil is returned to an oil tank 4 through a drain passage 10. The oil pump 3 is driven by an engine 1 through a belt 2.

A controller 11 controls an actual rear wheel steer angle of the rear wheels 21 and 22 by controlling the displacement of the piston 7a of the hydraulic actuator 7 through the servo valve 6. A servo amplifier 18 actuates the servo valve 6 in accordance with a desired rear wheel steer angle signal produced by the controller 11.

The controller 11 receives sensor output signals from vehicle speed sensor 13, steering wheel angle sensor 16, displacement sensor 17, and gear sensor 25.

The vehicle speed sensor 13 is provided in a transmission, and produces a plurality of pulses P so that the number of the pulses is proportional to the number of revolutions of the output gear of the transmission.

The steering wheel angle sensor 16 is made up of an encoder or a potentiometer, and produces a signal $\theta_1$ proportional to the angular displacement of the steering wheel 14. The signal $\theta_1$ corresponds to the actual front wheel steer angle.

The displacement sensor 17 is made up of a potentiometer or an encoder, and produces a signal $\theta_2$ proportional to the displacement of the piston rod 7b. The signal $\theta_2$ corresponds to the actual rear wheel steer angle.

The gear sensor 25 detects that the gear system of the transmission is in a forward position.

FIGS. 2 and 3 show programs executed by the controller 11.

The program of FIG. 2 is performed each time the pulse P produced by the vehicle speed sensor 13 is inputted into the controller 11. The vehicle speed sensor 13 produces one pulse P each time the vehicle travels a predetermined distance $\Delta x$. Therefore, the program of FIG. 2 is performed each time the predetermined distance $\Delta x$ is traveled by the vehicle.

At a step 51, the controller 11 determines the actual front wheel steer angle $\delta_F$ from the signal $\theta_1$ which is inputted to the controller 11 from the steering wheel angle sensor 16. The actual front wheel steer angle $\delta_F$ thus determined is stored in a memory temporarily.

At a step 52, the controller 11 reads a first course data item $\gamma(0)$ among $n+1$ course data items $\gamma(0) \ldots \gamma(n)$ which are stored in a memory, and determines a desired rear wheel steer angle $\overline{\delta}_R$ in accordance with the first course data item $\gamma(0)$.

Figure 4:
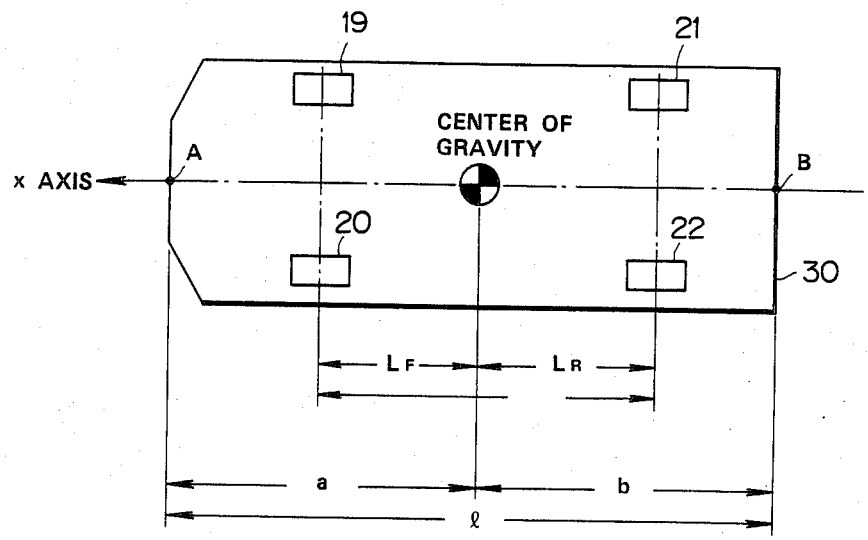
FIG. 4 is a schematic view of the vehicle for showing various dimensions used in the control system of FIG. 1.

As shown in FIG. 4, a front end midpoint A is an intersection between a front surface of a vehicle 30 and an x axis of the vehicle 30, and a rear end midpoint is an intersection between a rear surface of the vehicle 30 and the vehicle x axis. A distance between the front and rear midpoints A and B is a length l of the vehicle body.

The number n is the number of the pulses P produced by the vehicle speed sensor 3 while the vehicle travels the distance between the front and rear points A and B. Therefore;

$$n = \frac{l}{\Delta x} \quad (1)$$

That is, the course data items $\gamma(0) \ldots \gamma(n)$ contain data about the course of the front point A determined each time the front point A travels the distance $\Delta x$. There are stored the $n+1$ course data items which are determined while the vehicle travels the distance l.

The course data item $\gamma(0)$ contains data about the course of the front point A at an instant in which the point A assumed a position at the distance l behind. As a result, the course data items $\gamma(0) \ldots \gamma(n)$ represent the path or track of the front point A during movement through the distance l.

As shown in FIG. 3, the controller 11 performs an initialization when the ignition switch of the vehicle is turned on. That is, the controller 11 sets all of the course data items to zero at a step 62, and simultaneously sets a yaw angle $\phi$ to zero at a step 61 when the ignition switch is turned on.

The rear point B is located at the distance l behind front point A. Therefore, it is possible to cause the rear point B to follow the path of the front point A by controlling the rear wheel steer angle so that the course direction of the rear point B is maintained equal to the course data item $\gamma(0)$. This is the reason why the oldest course data item $\gamma(0)$ is used for determining the desired rear wheel steer angle at the step 52.

The desired rear wheel steer angle $\overline{\delta}_R$ is determined according to the following equation (2):

$$\overline{\delta}_R = \left( \gamma(0) - \phi - \frac{L_R - b}{L} \delta_F \right) \cdot \frac{L}{(L_F + b)} \quad (2)$$

As shown in FIG. 4, $L_F$ is a distance between a front axle and a center of gravity of the vehicle, $L_R$ is a distance between a rear axle and the center of gravity, b is a distance between the rear point B and the center of gravity, a is a distance between the front point A and the center of gravity, and L is a wheel base.

The equation (2) is obtained in the following manner. In a low speed vehicle motion, the dynamic characteristics of the vehicle have almost no influence on the turning motion of the vehicle, and the behavior of the vehicle can be expressed geometrically. Accordingly, a yaw rate $\dot{\phi}$ of the center of gravity of the vehicle is expressed as:

$$\dot{\phi} \approx \frac{V}{L} (\delta_F - \delta_R) \quad (3)$$

where $\delta_F$ is the actual front wheel steer angle, $\delta_R$ is the actual rear wheel steer angle, and V is the vehicle speed.

The sideslip angle $\beta$ of the center of gravity (in a vehicle axis system fixed in the vehicle body) is given by;

$$\beta \approx \frac{L_R}{L} \delta_F + \frac{L_F}{L} \delta_R \quad (4)$$

The sideslip angle $\beta_B$ of the rear point B (in the vehicle axis system) is obtained geometrically as follows:

$$\begin{aligned} \beta_B &\approx \beta - \frac{b\dot{\phi}}{V} \\ &\approx \frac{L_R}{L} \delta_F + \frac{L_F}{L} \delta_R - \frac{b}{L} (\delta_F - \delta_R) \\ &\approx \frac{(L_R - b)}{L} \delta_F + \frac{(L_F + b)}{L} \delta_R \end{aligned} \quad (5)$$

By using the yaw angle $\phi$ and the direction $\gamma(0)$ in which the rear point B should move, the sideslip angle $\beta_B$ is given by;

$$\beta_B = \gamma(0) - \phi \quad (6)$$

From the equations (5) and (6), the equation (2) is obtained as follows:

$$\delta_R = \left( \gamma(0) - \phi - \frac{L_R - b}{L} \delta_F \right) \cdot \frac{L}{(L_F + b)}$$

At step 53, the controller 11 determines the new angle $\phi$ from the actual front wheel steer angle $\delta_F$ and the desired rear wheel steer angle $\overline{\delta}_R$ determined at the step 52. The yaw angle $\phi$ is determined according to the following equation (7).

$$\phi = \phi_{old} + \frac{(\delta_F - \delta_R)}{L} \Delta x \quad (7)$$

where $\phi_{old}$ is an old value of the yaw angle $\phi$ which is determined in a previous operation cycle.

The equation (7) is obtained as follows: From the equation (3), the yaw angle $\phi$ is;

$$\begin{aligned} \phi &= \int \dot{\phi} dt \\ &\approx \int \frac{V}{L} (\delta_F - \delta_R) dt \\ &\approx \int \frac{(\delta_F - \delta_R)}{L} \cdot \frac{dx}{dt} dt \\ &\approx \int \frac{(\delta_F - \delta_R)}{L} dx \end{aligned} \quad (8)$$

If we let $\Delta x$ be small; the following equation (9) is obtained.

$$\phi(x) = \phi(x - \Delta x) + \frac{(\delta_F - \delta_R)}{L} \Delta x \quad (9)$$

Thus, the equation (7) is obtained from the equation (9).

At step 54, the controller 11 eliminates the value of the first course data item γ(0) which has been used at the step 52, and then performs a data shift operation by replacing the value of γ(i−1) by the value of the γ(i), where i is any whole number from 1 to n.

At step 55, the controller 11 determines a new value of the course data item γ(n) and replaces the old value of γ(n) by the new value.

The new value of the course data item γ(n) representing a course angle of the front point A is determined according to the following equation (10).

$$\gamma(n) = \phi + \frac{(L_R + a)}{L} \delta_F - \frac{(a - L_F)}{L} \delta_R \quad (10)$$

The equation (10) is obtained as follows:
The sideslip angle of the front point A is;

$$\beta_A = \beta + \frac{a}{V} \dot{\phi} \quad (11)$$

$$\approx \frac{L_R}{L} \delta_F + \frac{L_F}{L} \delta_R + \frac{a}{L}(\delta_F - \delta_R)$$

$$\approx \frac{(L_R + a)}{L} \delta_F + \frac{(L_F - a)}{L} \delta_R$$

The side slip angle $\beta_A$ is measured with respect to the vehicle axis system fixed to the vehicle body. Therefore, the corresponding angle measured with respect to the earth-fixed axis system is expressed as;

$$\gamma(n) = \beta_A + \phi \quad (12)$$

$$= \phi + \frac{(L_R + a)}{L} \delta_F - \frac{(a - L_F)}{L} \delta_R$$

Thus, the equation (10) can be obtained.

At step 56, the controller 11 outputs the control signal representing the desired rear wheel steer angle $\delta_R$ determined at step 52. In response to this control signal, the hydraulic actuator 7 alters the steer angle of the rear wheels 21 and 22 so that the actual rear wheel steer angle is maintained equal to the desired rear wheel steer angle $\delta_R$.

In this way, the controller 11 causes the rear point B to track the path of the front point A by repeating the process of steps 51-56 each time the vehicle travels the predetermined distance Δx.

Figure 5:
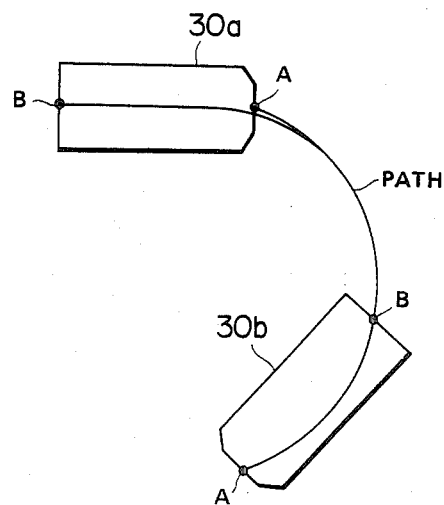
FIG. 5 is a view showing paths of front end midpoint A and rear end midpoint B of the vehicle controlled by the control system of FIG. 1.
Figure 6:
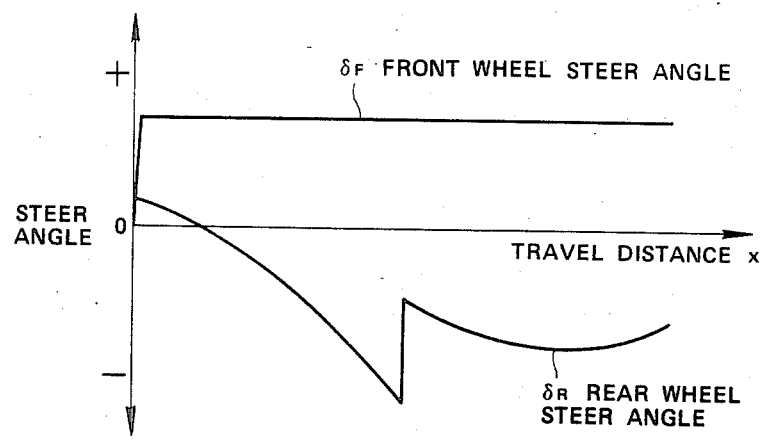
FIG. 6 is a graph showing variations of the front wheel and rear wheel steer angles during the turn of the vehicle shown in FIG. 5.

FIG. 5 shows an example of a behavior of the vehicle controlled by the system of this embodiment. In this example, the vehicle stands stationary at a position 30a initially. Then, the ignition switch is turned on at the position 30a, and the vehicle is moved by holding the front wheel steer angle fixed as shown in FIG. 6.

At the time the ignition switch is moved from the off state to the on state, the course angles γ(0) ... γ(nc) are all reset to zero. Therefore, the rear point B moves along a straight line until the distance traveled by the rear point B reaches the distance 1. That is, the rear point B moves rectilinearly toward the initial position assumed by the front point A when the vehicle was stationary at 30a.

After the rear point B reaches the initial position of the front point A, the rear point B follows the path of the front point A as the actual rear wheel steer angle $\delta_R$ is varied as shown in FIG. 7.

The control system of the present invention can prevent the rear end of a vehicle from swinging outwardly in a turn of the vehicle and can reduce an inner radius difference between front and rear wheels produced during a turn, by causing the midpoint of the rear end of the vehicle to follow the path of the midpoint of the front end of the vehicle. Accordingly, the control system of the present invention can prevent a collision of the vehicle against an object lying alongside the vehicle. Furthermore, the system of the present invention is advantageous for checking the safety in the rear of the vehicle. The present invention is especially effective when applied to trucks and other large-sized vehicles.

In the disclosed embodiment, the control of FIG. 2 is always performed irrespective of the vehicle speed. However, the outward swing of the vehicle rear end and the inner radius difference are especially problematical when the vehicle is turned along an arc of small radius at low speed. Therefore, the system of the present invention may be arranged so that control as in FIG. 2 is performed only when the vehicle speed is low. Alternatively, the control gain of the rear wheel steer angle may be made variable with the vehicle speed so that the effect of the present invention is produced sufficiently in a turn of small radius and low vehicle speed.

What is claimed is:

1. A steering control system for a vehicle having at least one steerable front wheel and at least one steerable rear wheel, comprising:
    sensor means comprising means for sensing an actual front wheel steer angle of said vehicle,
    means for measuring a travel distance traveled by said vehicle,
    a controller for estimating a path traveled by a predetermined front point of a front portion of said vehicle during motion of said vehicle, from said actual front wheel steer angle sensed by said front wheel steer angle sensing means, and for determining a desired rear wheel steer angle required to cause a predetermined rear point of a rear portion of said vehicle, to follow said path of said front point, means for measuring a travel distance traveled by said vehicle, said controller comprising means for determining a value of a course angle of said front point indicative of a course of said front point from said actual front wheel steer angle each time said travel distance measured by said measuring means increases by a predetermined distance increment, means for storing a predetermined number of the course angle values which have been determined most recently by said course angle determining means, and means for determining said desired rear wheel steer angle from the oldest value of said predetermined number of said course angle values stored by said storing means,
    actuator means for steering said at least one rear wheel of said vehicle in accordance with said desired rear wheel steer angle.

2. A steering control system according to claim 1 wherein said predetermined number equals n+1 where n is a quotient obtained by dividing a distance between said front and rear points by said predetermined distance increment.

3. A steering control system according to claim 2 wherein said controller further comprises means for determining a value of a yaw angle of said vehicle each time said travel distance increases by said predetermined distance increment, and said course angle determining means determines said course angle of said front point according to an equation that said course angle of said front point is equal to said yaw angle of said vehicle plus a sideslip angle of said front point.

4. A steering control system according to claim 3 wherein said desired rear wheel steer angle determining means determines said desired rear wheel steer angle according to an equation that a sideslip angle of said rear point is equal to the oldest valve of said predetermined number of said course angle values stored by said storing means minus said yaw angle of said vehicle.

5. A steering control system according to claim 4 wherein said controller sets said yaw angle of said vehicle to zero when said vehicle is in a predetermined condition.

6. A steering control system according to claim 5 wherein said controller sets all of said course angle values stored by said storing means to zero when said vehicle is in said predetermined condition.

7. A steering control system according to claim 6 wherein said controller sets said yaw angle and said course angle values to zero when an ignition switch of said vehicle is turned on.

8. A steering control system according to claim 7 wherein said yaw angle determining means determines said yaw angle according to an equation expressed as;

$$\phi = \phi_{old} + \frac{(\delta_F - \delta_R)}{L} \Delta x$$

where $\phi$ is a new value of said yaw angle to be determined in a current operation cycle, $\phi_{old}$ is a value of said yaw angle determined in a previous operation cycle, L is a wheel base of said vehicle, $\Delta x$ is said predetermined distance increment, $\delta_F$ is said actual front wheel steer angle, and $\delta_R$ is a rear wheel steer angle.

9. A steering control system according to claim 8 wherein said course angle determining means determines said course angle of said front point according to an equation expressed as;

$$\gamma = \phi + \frac{(L_R + a)}{L} \delta_F - \frac{(a - L_F)}{L} \delta_R$$

where $\gamma$ is said course angle of said front point, $L_R$ is a distance between a rear axle and a center of gravity of said vehicle, a is a distance between said front point and said center of gravity, and $L_F$ is a distance between a rear axle and said center of gravity.

10. A steering control system according to claim 9 wherein said desired rear wheel steer angle determining means determines said desired rear wheel steer angle according to an equation expressed as;

$$\bar{\delta}_R = \left( \gamma(0) - \phi - \frac{L_R - b}{L} \delta_F \right) \cdot \frac{L}{(L_F + b)}$$

where $\bar{\delta}_R$ is said desired rear wheel steer angle, $\gamma(0)$ is the oldest value of said course angle values stored in said storing means, and b is a distance between said rear point and said center of gravity.

11. A steering control system according to claim 10 wherein said rear wheel steer angle expressed as $\delta_R$ is equal to said desired rear wheel steer angle.

12. A steering control system according to claim 10 wherein said sensor means further comprises means for sensing an actual rear wheel steer angle of said vehicle, and said rear wheel steer angle expressed as $\delta_R$ is equal to said actual rear wheel steer angle sensed by said actual rear wheel steer angle sensing means.

13. A steering control system according to claim 10 wherein said storing means loses the oldest value of said course angle values each time a new value of said course angle is determined.

14. A steering control system according to claim 10 wherein said distance measuring means comprises a vehicle speed sensor for producing a pulse each time said predetermined distance increment is traveled by said vehicle.

15. A steering control system according to claim 10 wherein said sensor means further comprises means for sensing a vehicle speed of said vehicle, and said controller produces a control signal representing said desired rear wheel steer angle required to cause said rear point to follow said path of said front point only when said vehicle speed sensed by said vehicle speed sensing means is equal to or lower than a predetermined speed.

16. A steering control system according to claim 10 wherein said sensor means further comprises means for sensing a position of a drive system of said vehicle, and said controller produces a control signal representing said desired rear wheel steer angle required to cause said rear point to follow said path of said front point only when said drive system is in a state for driving said vehicle forwardly.

* * * * *